July 27, 1926.
J. H. WORTHINGTON
LENS SYSTEM
Filed June 11, 1924
1,593,786
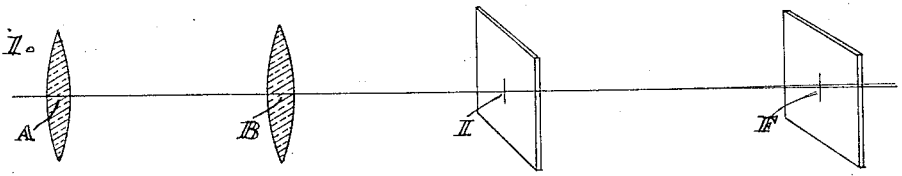
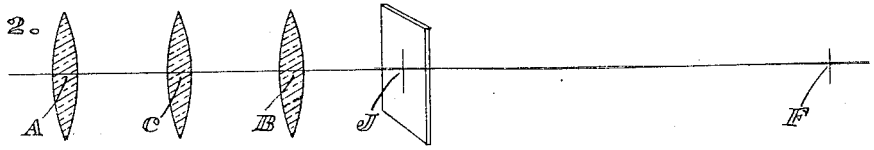
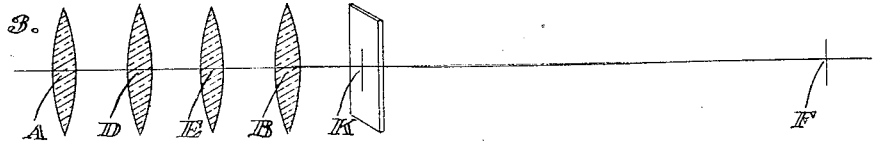

Patented July 27, 1926.

1,593,786

UNITED STATES PATENT OFFICE.

JAMES H. WORTHINGTON, OF CARMEL, CALIFORNIA.

LENS SYSTEM.

Application filed June 11, 1924. Serial No. 719,320.

My invention has for its particular object the production of an image through a lens system of large aperture, superior definition and short focus whereby shorter photographic exposures are required.

This result I attain by combining in series three or more convergent lenses, preferably of equal focal length and so placed that the image of a distant object obtained through my lens system is closer to the optical center of the series and covers a relatively larger field than has heretofore been obtainable.

The mounting comprises a plurality of lenses in series within the minor medial section of the focal length of one of them.

By referring to the accompanying drawings my invention will be made clear.

Fig. 1 represents a conventional lens system in horizontal section.

Figs. 2, 3 and 4 are similar to Fig. 1 except that the lenses are arranged according to my invention.

Throughout the figures similar letters refer to identical parts.

In Fig. 1 rays of light from lens A from an infinitely distant object would normally focus at F, the distance AF, the focal length of the lens, is now to be divided in medial section at B satisfying the formula $(BF)^2 =$ AB.AF the result will be that the focal point of the system AB will be at 1.

I have found that if now we interpose a similar lens C midway between A and B the focal plane J will be much closer to the lens C than before and the distance BJ will be substantially equal to the distance CB=½AB.

If on the other hand the distance AB be divided into three parts and additional duplicate lenses D and E be mounted therebetween the focal plane K will be much closer to B and the distance BK will be substantially one-third of the distance AB. If the distance AB be divided into four equal parts and three similar lenses F, G, H, be introduced the focal plane will be much closer to B and as indicated at L.

When the lenses are placed according to my invention as shown in Figs. 2, 3, or 4, the resulting image is better defined, the details are much sharper than can be obtained with the lenses in other positions and with the combination of my invention the $$\frac{\text{focal length}}{\text{aperture}} \text{ may be made equal to 1 or even less.}$$

And with this combination I have obtained excellent photographs of buildings in forty seconds illuminated only by moonlight, and in three hours illuminated by starlight alone.

I claim:

1. A lens system comprising a pair of lenses positioned on the extremities of the minor medial section of the focal length of one of them and another lens equidistant between the lenses of said pair all of said lenses being convergent and similar.

2. A lens system comprising a pair of lenses positioned on the extremities of the minor medial section of the focal length of one of them and another lens equidistant between the lenses of said pair all of said lenses being of the same focal length all of said lenses being convergent and similar.

3. A lens system comprising more than two convergent and similar lenses equally spaced on the minor medial section of the focal length of one of them.

4. A lens system comprising more than two convergent and similar lenses equally spaced on the minor medial section of the focal length of one of them, all of said lenses being of the same aperture and focal length.

5. A lens system comprising a pair of convergent similar lenses positioned on the extremity of the minor medial section of the focal length of one of them and a plurality of similar lenses equidistantly spaced between said first pair of lenses.

JAMES H. WORTHINGTON.